United States Patent [19]

Fava

[11] 4,129,619

[45] Dec. 12, 1978

[54] MOLDABLE BLEND OF POLYMETHYL METHACRYLATE AND STYRENE-MALEIMIDE

[75] Inventor: Ronald A. Fava, Monroeville, Pa.

[73] Assignee: ARCO Polymers, Inc., Philadelphia, Pa.

[21] Appl. No.: 863,964

[22] Filed: Dec. 23, 1977

[51] Int. Cl.² .................... C08L 33/12; C08L 35/06
[52] U.S. Cl. .................................. 260/901; 526/52.2; 526/15
[58] Field of Search ............... 260/901; 526/52.2, 15, 526/272, 317

[56] References Cited

U.S. PATENT DOCUMENTS

| 3,432,479 | 3/1969 | Verdoz et al. ............... 526/52.2 |
| 3,676,404 | 7/1972 | Nield ............................ 260/78 UA |
| 3,883,617 | 5/1975 | Krieg et al. .................... 260/883 |

Primary Examiner—Carman J. Seccuro
Attorney, Agent, or Firm—John R. Ewbank; Lewis J. Young

[57] ABSTRACT

A molding composition suitable for thermoplastic molding operations consists of a blend of:

(a) 10-90% by weight of polymethyl methacrylate; and
(b) 10-90% by weight of a copolymer derived by copolymerizing from about 5% to about 35% amino nitrogen derivative of an ethylenically unsaturated dicarboxylic acid, and from about 65% to 95% vinyl aromatic composition.

6 Claims, No Drawings

MOLDABLE BLEND OF POLYMETHYL METHACRYLATE AND STYRENE-MALEIMIDE

RELATED INVENTIONS

Reference is made to the applications of Ronald A. Fava, Ser. No. 863,962, filed Dec. 23, 1977 concerning "Thermoplastic Molding Composition of Polymethyl Methacrylate and Rubber Modified Styrene-Maleimide" and Ser. No. 863,963, filed Dec. 23, 1977 for "Plastic Alloy of Copolymers", all the disclosure of each of which is deemed here reiterated and incorporated herein.

BACKGROUND OF INVENTION

This invention relates to the blending of thermoplastic compositions having characteristics which are desirable but which have heretofor not been readily obtainable at a competitive cost.

Many organic liquids having a moderately low molecular weight are soluble in each other. When the molecular weight of an organic material is sufficiently great (macromolecular) to provide structural strength as a solid, such solid is generally not soluble in other macromolecular structural materials, (i.e. plastics). The compatibility and mutual solubility of organic plastics are generally not observed. Most attempts to mix pellets of different molding compositions at the time when the pellets are fed to an extruder result in extrudates having low strength by reason of the fracture lines at the boundaries amongst the different compositions. The discovery of a compatible blend of plastics, sometime referred to as plastic "alloys" is a significant and unexpected discovery by reason of the incompatibility of most of the conceivable permutations of mixtures of plastics.

Belgian Pat. No. 767,255 describes blends of polymethyl methacrylate and copolymers of styrene and maleic anhydride. Heretofor, copolymers of styrene and methyl methacrylate have been prepared, but such compositions have not had the combination of appropriate viscosity and softening temperatures desired in some operations.

Notwithstanding the persistent effort to prepare appropriate blends, there has been a failure by others to meet the demands for a blend having an attractive combination of adequate fluidity at molding temperatures, adequate stiffness in the molded product, and adequately high softening point.

SUMMARY OF THE INVENTION

In accordance with the present invention, a molding composition is prepared by heat blending polymethyl methacrylate and the copolymers of 65%-95% vinyl aromatic compound such as styrene, and 5-35% amino nitrogen derivative of an ethylenically unsaturated dicarboxylic acid such as maleimide. Useful products are obtained throughout a range of from about 10-90% methyl methacrylate and from about 10-90% copolymer of the type exemplified by styrene-maleimide.

The invention is further clarified by reference to a plurality of examples.

EXAMPLES 1-5

An extruder was employed for thoroughly mixing pellets of polymethyl methacrylate and pellets of a copolymer of styrene and maleimide containing about 8% maleimide. Such maleimide type of copolymer was prepared by copolymerizing maleic anhydride and styrene to produce a polymer which was thereafter converted from the anhydride to the imide by treatment with aqueous ammonia at a temperature of about 147° C. for about 12 hours at a pressure of about 5 atmospheres.

A series of compositions was prepared containing varying amounts of the two types of pellets. The extrudate was shaped into testing samples. It was observed that the stiffness was enhanced when the blend contained about 10% polymethyl methacrylate. It was also observed that the flexural strength was enhanced in the blend containing about 10% of the maleimide.

The usefulness of polymethyl methacrylate has been somewhat restricted because its softening point, as measured by a Vicat temperature of 241° F., was sufficiently low to be troublesome in some of the intended uses for molded plastic products. Such softening temperature can be increased by the inclusion of relatively small amounts of the maleimide. Particular attention is directed to the fact that a blend of about 50% of a methyl methacrylate and 50% maleimide had the advantageous combination of a flexural strength of 10,400 psi and a Vicat temperature of 254° F.

The data shown in Table 1 show some of the properties measured for 5 blends of these components. The unblended starting materials can be identified equivalently as Controls A and B, or as Examples A and B.

TABLE I

| Ex. | % MI in Blend | % PMMA in Blend | Flexural Modulus ($10^3$ psi) | Flexural Strength (psi) | Vicat Temp. (° F) | Density (g/cm$^3$) |
|---|---|---|---|---|---|---|
| A | 100 | 0 | 464 | 5,000 | 260 | 1.077 |
| 1 | 90 | 10 | 466 | 6,900 | 258 | 1.087 |
| 2 | 75 | 25 | 461 | 9,200 | 259 | 1.102 |
| 3 | 50 | 50 | 454 | 10,400 | 254 | 1.127 |
| 4 | 25 | 75 | 430 | 11,500 | 248 | 1.153 |
| 5 | 10 | 90 | 422 | 11,700 | 244 | 1.172 |
| B | 0 | 100 | 420 | 9,500 | 241 | 1.183 |

EXAMPLE 6

Various types of polymethyl methacrylate molding compositions having different particle sizes, different molecular weights, etc. are employed in experimental blends while obtaining the advantageous results described in connection with Examples 1-5. The experimental blends are prepared using maleimide-styrene copolymers containing various amounts of maleimide and it is established that copolymers containing concentrations within the range from 5% to 35% and 65% to 95% vinyl aryl monomer are suitable for use in the blends of the present invention.

EXAMPLE 7

By a series of tests it is established that the imides of maleic acid, fumaric acid, itaconic acid, citraconic acid, mesaconic acid, ethyl maleic acid, methyl itaconic acid, chloromaleic acid, dichloromaleic acid, bromomaleic acid, and dibromomaleic acid, are suitable as the amino nitrogen derivative of the ethylenically unsaturated dicarboxylic acid in the blends of the present invention. In preparing the ammonia derivatives, it is appropriate to utilize ammonia, methyl amine, ethyl amine, propyl amine, and/or isopropyl amine in preparing the nitrogen derivatives. It is appropriate to prepare the nitrogen derivative of the acid prior to the copolymerization, or if desired, the copolymer can be prepared from a precursor such as the anhydride, and the copolymer can be subjected to the ammonia type compound at an elevated pressure and temperature to prepare the nitrogen derivative of the copolymer comprising the ethylenically unsaturated dicarboxylic acid moiety.

EXAMPLE 8

Advantageous blends can be prepared in which the styrene-maleimide type of composition is derived from the copolymerization of the maleimide type compound with a suitable vinyl aryl monomer. Suitable examples of vinyl aryl monomers include styrene, alpha-methylstyrene, nuclear methyl-styrenes, ethylstyrene, isopropylstyrene, tertbutylstyrene, chlorostyrenes, dichlorostyrenes, vinyl naphthalene and the like.

Various modifications of the invention are possible without departing from the scope of the invention as set forth in the claim.

The invention claimed is:

1. A molding composition suitable for thermoplastic molding operations which comprises a blend of:
   (a) 10–90% by weight polymethyl methacrylate;
   (b) 10–90% by weight of the copolymer derived by copolymerizing from about 5% to about 35% imide derivative of an ethylenically unsaturated dicarboxylic acid, and from about 65% to about 95% vinyl aromatic composition.

2. The composition of claim 1 in which the concentration range of each of (a) and (b) is from about 25% to about 75%.

3. The composition of claim 2 in which the concentration of each of (a) and (b) is about 50%.

4. The composition of claim 1 in which (b) is a copolymer of maleimide and styrene.

5. The composition of claim 4 in which the copolymer contains about 8% maleimide.

6. The composition of claim 5 in which (b) is prepared by subjecting a corresponding copolymer of styrene and maleic anhydride to aqueous ammonia at an elevated temperature and pressure.

* * * * *